Dec. 3, 1935. W. J. F. BOETTCHER 2,022,842
MEAT TREATING APPLIANCE
Filed May 7, 1934
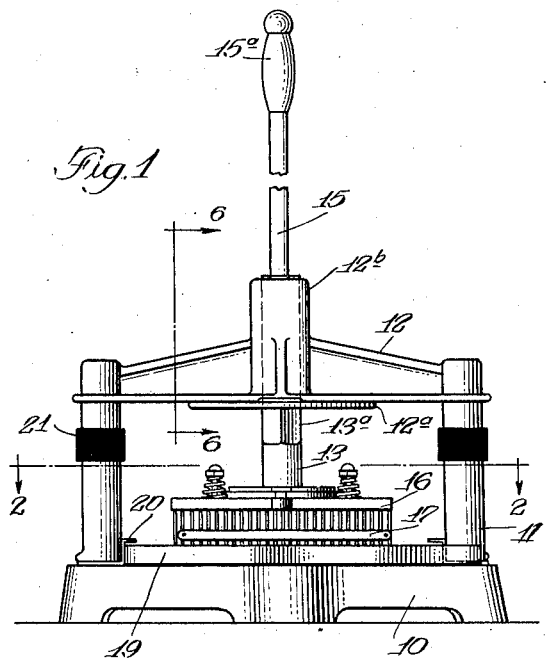
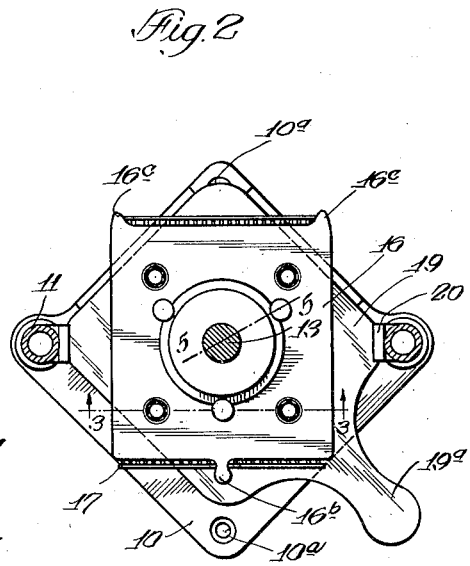
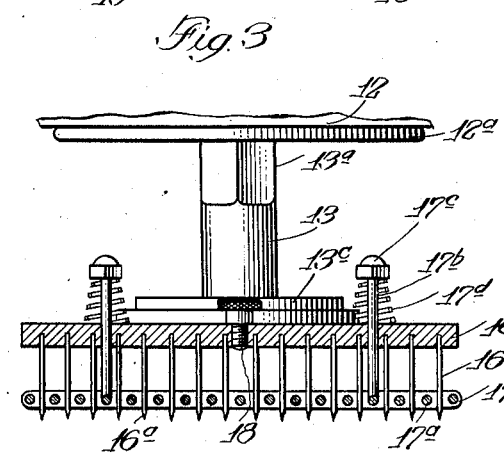
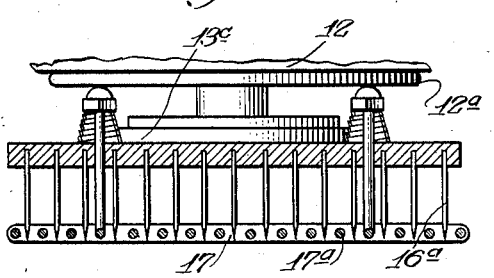
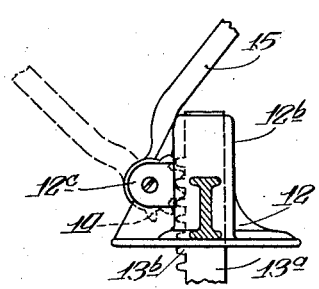
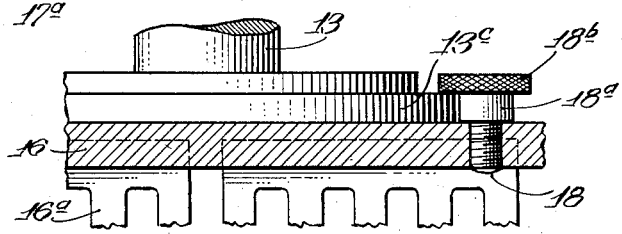
Inventor:
William J. F. Boettcher
By: Stevens & Batchelor
Att'ys Patented Dec. 3, 1935

2,022,842

UNITED STATES PATENT OFFICE 2,022,842

MEAT-TREATING APPLIANCE

William J. F. Boettcher, Chicago, Ill.

Application May 7, 1934, Serial No. 724,412

15 Claims. (Cl. 17—25)

My invention relates to meat market equipment, and more particularly to appliances for cutting the fibres of steak and other meats to make them tender, and my main object is to provide an appliance of this kind whose operative elements are easily taken apart for cleaning, making the appliance highly sanitary.

A further object of the invention is to design the cutting member for direct and uniform action in the direction of the meat, enabling the latter to be treated to the same extent over its entire surface.

A still further object of the invention is to so mount the cutting member of the appliance that it is easily movable to change the direction of the cut and so secure different cuttings of the meat.

Another object of the invention is to construct the novel appliance with a simple form of separator which automatically separates the meat from the cutting member when the latter is returned from a cutting stroke.

An additional object of the invention is to construct the same with few parts which are simple and rugged, whereby to make the appliance inexpensive to manufacture, easy to use, and durable over a long period.

With the above objects in view and any others that may suggest themselves from the specification and claims to follow, a better understanding of the invention may be had by reference to the accompanying drawing, in which—

Fig. 1 is an elevation of the appliance when the cutting member has been given a working stroke;

Fig. 2 is a section on the line 2—2 of Fig. 1;

Fig. 3 is a section on the line 3—3 of Fig. 2;

Fig. 4 is a view similar to Fig. 3 showing the cutting member raised;

Fig. 5 is a section on the line 5—5 of Fig. 2; and

Fig. 6 is a section on the line 6—6 of Fig. 1.

Referring specifically to the drawing, the novel appliance has a heavy metal base 10 for its foundation, the same being of square form and having holes 10a for the application of screws or other means to fasten the appliance on a counter or other support.

At diagonally opposite corners of the base are erected posts 11, which are spanned at their upper ends by a cross head 12, the latter having a bottom enlargement in the form of a horizontal plate 12a, and a central upstanding neck 12b.

The neck 12b of the cross head 12 is made with a square vertical bore to slidably receive the square portion 13a of a vertical stem 13. The said portion, as per Figure 6, is formed on one side with a gear rack 13b along which is operative a gear sector 14 journaled in ears 12c extending from the neck 12b. The gear sector 14 carries a long arm 15 whose outer end is fashioned into a handle 15a. The stem 13 has a circular base flange 13c against which is placed from underneath the meat cutting member 16. This member comprises a heavy metal plate of square form from which project a large number of steel blades or knives 16a. While the faces of all the knives are parallel to each other, each row of knives is preferably staggered from the next, in order that the perforations in the meat may be well distributed. Below the plate 16 of the cutting member is disposed a horizontal grid 17 of sturdy construction. The grid is preferably of aluminum or other non-corrodible material and it is placed so that its bars 17a extend between the rows of the cutting knives 16a as clearly shown in Fig. 3. For purposes of support, the grid has upstanding stems 17b which pass loosely through the plate 16 and are terminally threaded to receive cap nuts 17c, coil springs 17d being interposed between the cap nuts and the plate 16. The grid is thus suspended from the plate 16 through the medium of the springs 17d.

The plate 16 of the cutting member is not made fast to the base flange 13c of the stem 13, but is supported from the flange by receiving a set of three or more screws 18 in proximity to the periphery of the flange. The screws have neck portions 18a immediately opposite the said flange and heads 18b overlapping the flange, as clearly shown in Fig. 5. The heads 18b thus secure the support of the plate from the flange 13; yet, the height of the neck portions 18a is such that a slight amount of clearance is present between such portions and the flange, and also between the heads and the latter, so that the plate 16 may be swung in one or the other rotary direction relative to the flange. For this purpose, the plate is extended with a short handle 16b; and diagonally opposite from the handle the corners of the plate are extended with lugs 16c. The base 10 receives a square meat board 19, having a handle 19a extending from one side. In order that this board may be held in place, retainer flanges 20 overlap the side corners of the board, as shown in Fig. 2, these flanges being secured between the posts 11 and the base. Of course, the board is easily removable when drawn in a forward direction, and it may be stationed either in the position shown in Fig. 2 or with the handle in a similar position on the left-hand side of the center of the appliance.

In the use of the appliance, the steak or other meat is placed on the board 19 and the lever 15 swung from the dotted line to the full line position indicated in Fig. 6. This action lowers the cutting member 16 until the grid rests on the meat and the knives 16a pierce or penetrate the latter. The lever is then swung back; however, the meat is most apt to adhere to the knives and rise with them. This will continue until the cap nuts 17c strike the cross head plate 12a, at which point the grid 17 remains stationary while the cutting member continues to rise. The grid thus holds the meat while the knives rise out of it, the meat then dropping to the board and the springs 17d yielding to the ascent of the plate 16 to the point where the flange 13 meets the plate 12a or some other suitable stopping element. With the cuts or slits in the meat all made in one direction, it may be desirable to impart a series of cuts in a different direction in order to more thoroughly sever the fibers or tendons in the meat. For this purpose, it is only necessary to swing the cutting member by means of the handle 16b to the coresponding position, the limit of swing being practically 90 degrees as controlled by the meeting of either plate lug 16c with its related post 11. I have fitted rubber rings 21 around the upper portions of the posts 11 at points corresponding to the idle position of the plate 16, so that the striking of either post by the corresponding lug 16c will not mar or crack the enamel which I intend as a coating for the posts, the cross head, and the plate 12a for purposes of sanitation. Should the grid or the array of knives become clogged or coated with adhering particles of meat, it is an easy matter to remove the entire assembly of the cutting member and grid by simply taking out the screws 18. This renders the said assembly entirely free of the support and the frame of the appliance, enabling the assembly to be immersed into a cleaning or boiling solution to divest it of all foreign matter and quickly render it clean and sanitary before it is again to be used.

It will be seen that I have provided an appliance for the purpose specified which is simple, easy to manipulate and clean, and made sufficiently strong to last for a long time without the need of appreciable repair or attention.

I claim:—

1. A meat treating appliance comprising a base, a frame erected over the same, a non-rotatable support vertically reciprocable in the frame, and a meat cutting member carried by the bottom of the support and freely rotatable about the latter.

2. The structure of claim 1, a meat separating grid carried by the meat cutting member, means suspending the grid from the latter, and a stop carried by the frame to check the rise of the grid when the cutting member has risen to a predetermined limit.

3. A meat treating appliance comprising a base, a frame erected over the same, a non-rotatable stem vertically reciprocable in the frame and having a circular base, a meat cutting member under the latter, and means to suspend the member from the base to render the member freely rotatable about the latter.

4. The structure of claim 3, said means comprising elements carried by the member and overhanging the peripheral portion of the base.

5. The structure of claim 3, said means comprising screws carried by the member in proximity to the periphery of the base, and heads for the screws overlapping the peripheral portion of the base.

6. The structure of claim 3, a hand lever carried by the frame, and a connection between the hand lever and the stem to operate the latter by the manipulation of the hand lever.

7. The structure of claim 3, a hand lever pivoted to the frame to swing in a vertical plane, and meshing gear formations between the hand lever and the stem whereby to operate the latter when the hand lever is swung accordingly.

8. The structure of claim 3, a meat separating grid carried by the meat cutting member, means suspending the grid from the latter, and a stop carried by the frame to check the rise of the grid when the cutting member has risen to a predetermined limit, said stop being a plate in the zone of said suspending means and effective at any point at which said suspending means may be located in the rotation of the cutting member.

9. The structure of claim 3, a meat separating grid carried by the meat cutting member, means suspending the grid from the latter, and a stop carried by the frame to check the rise of the grid when the cutting member has risen to a predetermined limit, said suspending means being at equidistant points from the stem, and said stop comprising a circular plate carried by the frame and extending to the zone of said suspending means, whereby to be effective at any point at which said suspending means may be located in the rotation of the cutting member.

10. The structure of claim 3, a meat separating grid carried by the meat cutting member, means suspending the grid from the latter, and a stop carried by the frame to check the rise of the grid when the cutting meber has risen to a predetermined limit, said stop means comprising pins rising from the grid through openings in the cutting member, caps at the upper ends of the pins and expansive springs between the caps and the cutting member.

11. A meat treating appliance comprising a base of substantially square form, an arched frame erected with its feet at diagonally opposite corners of the base, a bearing in the center of the arch head and having a non-circular bore, a non-circular stem vertically reciprocable in said bore, means to manualy operate the stem, and a meat cutting member carried by the stem over the base.

12. The structure of claim 11, said member having a substantially square head plate rotatable relative to the stem, and a handle extending from the head plate for the manual control thereof.

13. The structure of claim 11, said member having a substantially square head plate rotatable relative to the stem, and lugs extending from adjacent corners of the head plate and adapted to meet the correspondingly located arched feet in order to limit the swing of the head plate in either direction.

14. The structure of claim 11, said member having a substantially square head plate rotatable relative to the stem, lugs extending from adjacent corners of the head plate and adapted to meet the correspondingly located arched feet in order to limit the swing of the head plate in either direction, and cushion bands about the feet at a height corresponding to the raised position of the head plate and adapted to cushion the impact of said lugs.

15. A meat treating appliance comprising a base of substantially square form, an arched frame erected with its feet at diagonally opposite corners of the base, a bearing in the center of the arch head and having a non-circular bore, a non-circular stem vertically reciprocable in said bore, means to manually operate the stem, a meat cutting member carried by the stem over the base, said base being adapted to receive a substantially square meat board, and retainers extended from the feet over the corners of the board adjacent thereto and overlapping said corners to retain said board in place.

WILLIAM J. F. BOETTCHER.